United States Patent
Kim et al.

(10) Patent No.: US 12,043,712 B2
(45) Date of Patent: Jul. 23, 2024

(54) GRAPHITE SHEET POLYIMIDE FILM COMPRISING GRAPHENE-CONTAINING SPHERICAL PI-BASED FILLER, MANUFACTURING METHOD THEREFOR, AND GRAPHITE SHEET MANUFACTURED USING SAME

(71) Applicant: PI ADVANCED MATERIALS CO., LTD., Chungcheongbuk-do (KR)

(72) Inventors: Kyung Su Kim, Seoul (KR); Jeong Yeul Choi, Anyang-Si (KR); Dong Young Won, Seoul (KR)

(73) Assignee: PI ADVANCED MATERIALS CO., LTD., Chungcheongbuk-do (KR)

(*) Notice: Subject to any disclaimer, the term of this patent is extended or adjusted under 35 U.S.C. 154(b) by 1000 days.

(21) Appl. No.: 16/975,574

(22) PCT Filed: Jul. 20, 2018

(86) PCT No.: PCT/KR2018/008200
§ 371 (c)(1),
(2) Date: Aug. 25, 2020

(87) PCT Pub. No.: WO2019/168245
PCT Pub. Date: Sep. 6, 2019

(65) Prior Publication Data
US 2020/0399435 A1  Dec. 24, 2020

(30) Foreign Application Priority Data
Feb. 28, 2018 (KR) .................. 10-2018-0024301

(51) Int. Cl.
| C08J 5/18 | (2006.01) |
| C08K 3/04 | (2006.01) |
| C08K 9/04 | (2006.01) |
| C08L 79/08 | (2006.01) |
| C08K 3/26 | (2006.01) |
| C08K 3/30 | (2006.01) |
| C08K 3/32 | (2006.01) |

(52) U.S. Cl.
CPC .................. *C08J 5/18* (2013.01); *C08K 3/042* (2017.05); *C08K 9/04* (2013.01); *C08L 79/08* (2013.01); *C08J 2379/08* (2013.01); *C08K 2003/265* (2013.01); *C08K 2003/3045* (2013.01); *C08K 2003/325* (2013.01)

(58) Field of Classification Search
CPC ......... C08J 5/18; C08J 2379/08; C08K 3/042; C08K 9/04; C08K 2003/265; C08K 2003/3045; C08K 2003/325; C08L 79/08
See application file for complete search history.

(56) References Cited

U.S. PATENT DOCUMENTS

| 2006/0035085 A1 | 2/2006 | Ozaki et al. | |
| 2011/0265980 A1 | 11/2011 | Kubo et al. | |
| 2020/0133048 A1* | 4/2020 | Oka | C08G 73/1032 |
| 2020/0291180 A1* | 9/2020 | Won | C08J 5/18 |
| 2020/0399183 A1* | 12/2020 | Kim | C08J 5/18 |
| 2024/0002615 A1* | 1/2024 | Min | C04B 35/524 |

FOREIGN PATENT DOCUMENTS

| JP | 2008024571 A | | 2/2008 | |
| JP | 2017043668 A | | 3/2017 | |
| JP | 2017114098 A | * | 6/2017 | ............ B32B 27/34 |
| KR | 10-2001-0011184 A | | 2/2001 | |
| KR | 20120140447 A | | 12/2012 | |
| KR | 20150045314 A | * | 4/2015 | ........... C01B 32/205 |
| KR | 101527164 B1 | | 6/2015 | |
| KR | 10-2017-0024532 A | | 3/2017 | |
| KR | 10-2017-0032910 A | | 3/2017 | |
| KR | 20170049912 A | | 5/2017 | |
| WO | WO-2005019132 A1 | | 3/2005 | |

OTHER PUBLICATIONS

Machine translation of JP 2017114098 A to Toida et al., published Jun. 29, 2017 (Year: 2017).*
Machine translation of KR 20150045314 A to Kim et al., published Apr. 28, 2015 (Year: 2015).*
Office Action for corresponding Japanese patent application No. 2020-545164 dated Aug. 17, 2021, two pages.
International Search Report (in English and Korean) and Written Opinion (in Korean) of the International Searching Authority, issued in PCT/KR2018/008200, mailed Dec. 11, 2018; ISA/KR.

* cited by examiner

*Primary Examiner* — Jane L Stanley
(74) *Attorney, Agent, or Firm* — Harness, Dickey & Pierce, P.L.C.

(57) ABSTRACT

The present invention provides a graphite sheet polyimide film derived from a first precursor composition comprising a first polyamic acid, the polyimide film comprising a sublimable inorganic filler and a graphene-containing spherical polyimide-based filler.

21 Claims, 2 Drawing Sheets

[FIG. 1]
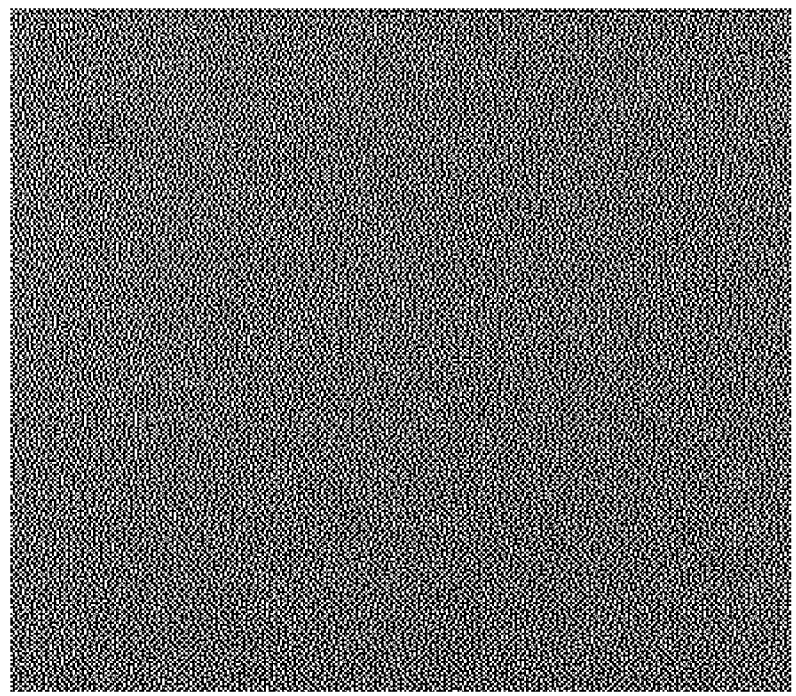

[FIG. 2]
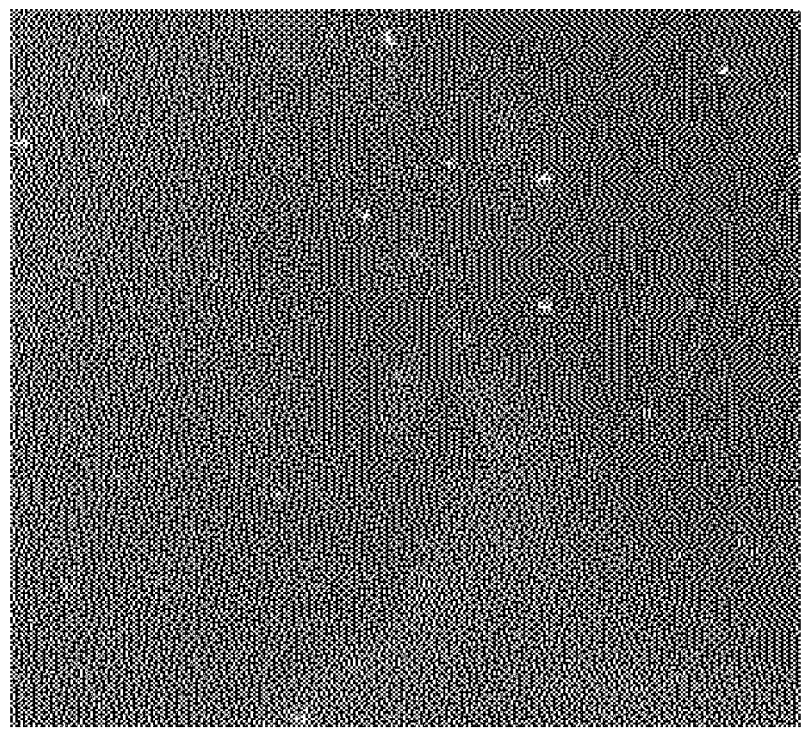

GRAPHITE SHEET POLYIMIDE FILM COMPRISING GRAPHENE-CONTAINING SPHERICAL PI-BASED FILLER, MANUFACTURING METHOD THEREFOR, AND GRAPHITE SHEET MANUFACTURED USING SAME

CROSS-REFERENCE TO RELATED APPLICATIONS

This application is a 371 U.S. National Phase of International Application No. PCT/KR2018/008200, filed Jul. 20, 2018, which claims priority to Korean Patent Application No. 10-2018-0024301, filed Feb. 28, 2018. The entire disclosures of the above applications are incorporated herein by reference.

TECHNICAL FIELD

The present invention relates to a polyimide film for graphite sheets including spherical graphene-containing polyimide (PI)-based fillers, a method of manufacturing the same, and a graphite sheet manufactured using the same.

BACKGROUND ART

Recently, with reduction in weight and size and improvement in compactness and integration degree, electronic devices suffer from various problems due to heat load through increase in heat generation amount per unit volume. Such problems can have direct adverse effects on performance of the electronic devices, such as decrease in operation speed of a semiconductor due to heat load, reduction in lifespan due to deterioration of a battery, or the like.

For such reasons, effective heat dissipation of the electronic devices has emerged as a very important task.

As a heat dissipation means for electronic devices, graphite having good thermal conductivity has been spotlighted. In particular, artificial graphite sheets allowing easy machining and having about two to seven times higher thermal conductivity than copper or aluminum have attracted attention in the art.

The artificial graphite sheets can be manufactured through carbonization and graphitization of a polymer. Among various polymers, a heat resistant polymer capable of sustaining a temperature of about 400° C. or more may be used as a graphite precursor. An example of the heat resistant polymer may include PI.

Polyimide is a polymer material mainly consisting of a strong aromatic backbone and an imide ring having good chemical stability. Polyimide has the highest levels of heat resistance, chemical resistance, electrical insulation, chemical resistance, and weather resistance among various organic materials, and is known to be an optimal graphite precursor by securing good yield, a high degree of crystallization, and high thermal conductivity in manufacture of artificial graphite sheets.

In general, it is known in the art that the properties of the artificial graphite sheet are significantly affected by the properties of polyimide used as the graphite precursor thereof, and modification of polyimide has been actively carried out for improvement of the properties of the artificial graphite sheet. In particular, various attempts have been made to improve thermal conductivity of the artificial graphite sheet.

For example, a high alignment polyimide film is applied to manufacture of a graphite sheet. The high alignment polyimide film is manufactured by drying a polyamic acid used as a precursor, followed by aligning polymer chains in a plane direction of a final film through drawing or compression.

The regularly aligned polymer chains form a graphite layer having good crystallinity through regular arrangement of carbon atoms in carbonization and graphitization processes. In this way, a graphite sheet of a "multilayer graphite structure" having good crystallinity can be manufactured using such a high alignment polyimide film.

However, although such a graphite sheet exhibits very good thermal conductivity in a two-dimensional direction thereof, thermal conductivity of the graphite sheet in a thickness direction thereof is about 1% or less of the thermal conductivity thereof in the two-dimensional direction. It is estimated that this phenomenon is caused by a physical gap between graphite layers placed to overlap each other by electrical attractive force.

Therefore, there is a need for a graphite sheet exhibiting good thermal conductivity not only in the plane direction but also in the thickness direction and a polyimide resin allowing implementation of such a graphite sheet.

DISCLOSURE

Technical Problem

It is an object of the present invention to provide a novel polyimide film and a graphite sheet manufactured using the same.

In accordance with one aspect of the present invention, a polyimide film including sublimable inorganic fillers and graphene-containing spherical polyimide fillers can realize a graphite sheet having significantly improved thermal conductivity not only in a plane direction thereof but also in a thickness direction thereof.

In accordance with another aspect of the present invention, it is possible to realize a polyimide film having improved packing efficiency of polymer chains using two types of catalysts having different properties upon imidization of a precursor composition of the polyimide film.

Further, it is possible to manufacture a graphite sheet having good crystallinity and thermal conductivity using the polyimide film.

The present invention is aimed at providing particular embodiments thereof.

Technical Solution

A PI-based polyimide film according to the present invention can provide a graphite sheet having a thermal conductivity of 1,000 W/m·K or more in a plane direction thereof and a thermal conductivity of 60 W/m·K or more in a thickness direction thereof, and details of the present invention will be described in the following description.

In accordance with a first aspect of the present invention, there is provided a polyimide film for graphite sheets derived from a precursor composition including a first polyamic acid, the polyimide film including sublimable inorganic fillers and graphene-containing spherical polyimide fillers.

In accordance with a second aspect of the present invention, there is provided a method of manufacturing a polyimide film capable of enhancing packing efficiency of polyimide chains.

In accordance with a third aspect of the present invention, there are provided a graphite sheet manufactured using the polyimide film and an electronic device including the same.

Hereinafter, embodiments of the preset invention will be described in detail in the order of a "polyimide film", a "method of manufacturing a polyimide film" and a "graphite sheet".

It should be understood that terms or words used in this specification and claims have to be interpreted as having meanings and concepts consistent with the technical idea of the present invention rather than typical or dictionary interpretation on a principle that an inventor is allowed to properly define the concept of the terms in order to explain their own invention in the best way.

Therefore, since embodiments disclosed in this specification are merely preferred examples of the present invention and do not fully describe the technical idea of the present invention, it will be appreciated that there can be various equivalents and alterations thereto at a filing date of the present application.

As used herein, the singular forms "a," "an," and "the" are intended to include the plural forms as well, unless the context clearly indicates otherwise. It will be further understood that the terms "comprises," "comprising," "includes," and/or "including," as used in this specification, specify the presence of stated features, integers, steps, operations, elements, components, and/or groups thereof, but do not preclude the presence or addition of one or more other features, integers, steps, operations, elements, components, and/or groups thereof.

As used herein, "dianhydride" is intended to include a precursor or derivative thereof, which may not technically be a dianhydride, but will nevertheless react with diamine to form a polyamic acid, which in turn is converted into polyimide.

As used herein, "diamine" is intended to include a precursor or derivative thereof, which may not technically be a diamine, but will nevertheless react with dianhydride to form polyamic acid, which in turn is converted into polyimide.

It will be understood that disclosure of a range of values, a preferred range of values, or preferred upper and lower limits for a given parameter, such as amount and concentration, subsumes all possible sub-ranges for the parameter which may be obtained by combining any sets of values within upper and low limits or preferred values as disclosed. Unless indicated otherwise, it is intended that a numerical range recited herein encompass end points thereof, as well as all integers and fractions between the end points. Further, it is intended that the scope of the present invention not be limited to specific values used in defining a range for a certain parameter.

First Aspect: Polyimide Film

A polyimide film according to the present invention is a polyimide film for graphite sheets derived from a precursor composition including a first polyamic acid, and includes sublimable inorganic fillers and graphene-containing spherical polyimide fillers.

The inorganic fillers can induce expansion within the polyimide film through sublimation upon carbonization and/or graphitization of the polyimide film. Such expansion allows formation of a graphite sheet having good quality through efficient discharge of sublimation gas upon carbonization and/or graphitization of the polyimide film, and voids generated by expansion can improve bending resistance (flexibility) of the graphite sheet.

However, since excessive expansion and a number of voids generated thereby can degrade the graphite sheet through generation of surface defects or significant deterioration in thermal conductivity and mechanical properties of the graphite sheet, the kind, content and size of the inorganic fillers must be carefully selected.

According to one embodiment, the inorganic fillers may be present in an amount of 0.2 parts by weight to 0.5 parts by weight relative to 100 parts by weight of the polyamic acid.

If the content of the inorganic fillers is less than this range, it is difficult to induce the aforementioned expansion phenomenon. In this case, efficient discharge of sublimation gas from the polyimide film cannot be achieved upon carbonization and/or graphitization of the polyimide film.

The sublimation gas in the polyimide film obstructs rearrangement of carbon atoms to provide an adverse effect on conversion into artificial graphite having good purity, thereby causing deterioration in crystallinity of the graphite sheet.

Further, assuming that carbonization and/or graphitization occur substantially at the same time on a surface layer of the polyimide film and inside the polyimide film, the sublimation gas generated in the polyimide film can damage or fracture of a graphite structure formed on the surface layer of the polyimide film, thereby making it difficult to obtain a graphite sheet having good quality.

On the other hand, if the content of the inorganic fillers is less than the above range, surface roughness of the polyimide film can be deteriorated.

Here, if surface roughness of the polyimide film is excessively decreased, friction between surfaces of overlapping portions of the polyimide film increases, thereby deteriorating process handling properties. Specifically, increased adhesion between the overlapping portions of the polyimide film makes it difficult to correct a winding error due to meandering in the course of winding the polyimide film, thereby causing deterioration in winding properties and generation of a blocking phenomenon due to increase in adhesive strength upon corona treatment.

Moreover, when fine foreign matter enters a gap between the overlapping portions upon winding the polyimide film, low surface roughness of the polyimide film makes it difficult to secure a space capable of compensating for the size of the foreign matter. As a result, as a roll thickness increases by repeating winding of the polyimide film, deviation in thickness of a portion of the polyimide film corresponding to the foreign mater increases and a protrusion mark is formed on the polyimide film due to deformation caused by the foreign matter.

If the content of the inorganic fillers exceeds the above range, dispersion of the inorganic fillers can be deteriorated, whereby some agglomerated inorganic fillers can be exposed on the surface of the polyimide film, thereby causing surface defects.

On the other hand, an excess of the inorganic fillers can damage the internal structure of the graphite sheet through excessive expansion of the polyimide film upon carbonization and graphitization, thereby causing deterioration in thermal conductivity of the graphite sheet and significant increase in the number of bright spots, which are expansion marks, on the surface of the graphite sheet.

An average particle diameter of the inorganic fillers may also be determined under the same principle as the principle used in determining the content of the inorganic fillers described above. Specifically, the inorganic fillers may have an average particle diameter of 1.5 μm to 4.5 μm.

If the average particle diameter of the inorganic fillers is less than the above range, surface roughness of the polyimide film can be deteriorated. In addition, use of the inorganic fillers having an excessively small particle diameter can make it difficult to induce a desired level of expansion upon carbonization and graphitization, thereby causing the problems described above.

If the average particle diameter of the inorganic fillers exceeds the above range, an excess of bright spots can be disadvantageously formed together with surface defects.

The inorganic fillers may include at least one type of inorganic particles selected from the group consisting of, for example, dicalcium phosphate, barium sulfate and calcium carbonate, without being limited thereto.

The spherical polyimide fillers may be provided in the form of a first composite having one or more graphene particles dispersed inside a polyimide resin, a second composite having one or more graphene particles attached to an outer surface of the polyimide resin, or a third composite formed through combination of the first composite and the second composite, without being limited thereto.

The graphene may have a sheet structure having an average major diameter of 5 μm to 15 μm and an average length of 1 nm to 10 nm with respect to the perpendicular direction thereof.

The polyimide fillers play an important role in determination of thermal conductivity of the graphite sheet, specifically thermal conductivity of the graphite sheet in the thickness direction thereof, upon carbonization and/or graphitization. Thus, the content and particle size of the polyimide fillers must be carefully determined.

According to one embodiment, the polyimide fillers may be present in an amount of about 0.1 parts by weight to about 5 parts by weight relative to 100 parts by weight of the first polyamic acid and may have an average particle diameter of 1 μm to 10 μm.

If the content of the polyimide fillers is less than the above content range, it is difficult to achieve improvement in thermal conductivity of the graphite sheet in the thickness direction thereof. This result is the same as in the case where the average particle diameter of the polyimide fillers is less than the above size range.

Such problems will become apparent from the description of the following embodiments.

If the content of the polyimide fillers exceeds the above content range, dispersion of the polyimide fillers can become deteriorated, whereby some agglomerated inorganic fillers can be exposed on the surface of the polyimide film, thereby causing surface defects.

Moreover, an excess of the polyimide fillers can damage the structure of the graphite sheet by obstructing rearrangement of carbon atoms upon carbonization and/or graphitization, thereby causing significant deterioration in thermal conductivity of the graphite sheet in the plane direction thereof.

However, within the above content range, the polyimide fillers can realize a graphite sheet having good thermal conductivity without providing these problems.

This result is the same as in the case where the average particle diameter of the polyimide fillers exceeds the above size range.

The polyimide fillers may include second polyimide chains derived from a second polyamic acid, in which a composition of monomers constituting the second polyamic acid may be the same as or different from a composition of monomers constituting the first polyamic acid.

The polyimide fillers may include 1 part by weight to 5 parts by weight of graphene relative to 100 parts by weight of the second polyamic acid.

If the content of graphene is less than this content range, it is difficult to achieve improvement in thermal conductivity of the graphite sheet.

If the content of graphene exceeds the above range, there can be an undesirable problem of excessive increase in manufacturing costs, as compared with improvement in thermal conductivity. Further, the polyimide fillers containing an excess of graphene undergo significant decrease in mechanical strength and thus cannot maintain a spherical shape thereof.

It should be noted that the polyimide film according to the present invention includes the graphene-containing polyimide fillers.

If graphene is used alone as fillers, there are problems, such as uneven distribution of the graphene in the polyamic acid, easy detachment of the graphene in the course of drying the polyamic acid, and occurrence of defects, such as creases, swelling, pin holes or cracks, due to difference in thermal and mechanical properties between polyimide and graphene in the course of stretching a gel film or a polyimide film.

However, when the graphene-containing polyimide fillers are used, a polyimide resin having the same or similar properties to the polyimide film constitutes a composite together with the graphene, thereby preventing or significantly suppressing the aforementioned problems.

Further, assuming that the polyimide film is converted into a graphite sheet through carbonization and/or graphitization, a polyimide component constituting the polyimide fillers according to the present invention is converted independently of a polyimide component constituting the polyimide film to form a particular structure constituting a heat transfer path in the thickness direction of the graphite sheet.

This will be described in detail with reference to the following embodiments.

In one embodiment, the polyimide film includes first polyimide chains derived from the first polyamic acid, in which at least some of the first polyimide chains are aligned in a plane direction to form a multilayer structure and at least some of the polyimide fillers are dispersed between layers of the multilayer structure.

Upon carbonization and/or graphitization of the polyimide film, at least part of the multilayer structure of the first polyimide chains may be graphitized to form a multilayer graphite structure and at least part of the polyimide fillers may be graphitized to form a linking portion which connects the layers of the multilayer graphite structure to each other.

The linking portion may include a first linking portion formed through graphitization of second polyimide chains of the polyimide fillers and a second linking portion derived from the graphene of the polyimide fillers. Here, some graphene not forming the second linking portion may be interposed between the layers of the multilayer graphite structure to be substantially parallel to the layers thereof.

The first linking portion may be a two-dimensional graphene sheet, a two-dimensional carbon allotrope having a similar shape to the graphene sheet, or a three-dimensional carbon allotrope formed by stacking the two-dimensional carbon allotropes, and may act as a heat transfer path between the layers.

Since heat is transferred along layer surfaces of the multilayer graphite structure in a typical graphite sheet, the graphite sheet has higher thermal conductivity in the plane direction of the multilayer graphite structure and lower thermal conductivity in the thickness direction thereof due to a physical gap between the layers of the multilayer structure.

Conversely, the graphite sheet derived from the polyimide film according to the present invention allows easy transfer of some heat between the layers of the multilayer graphite structure along the first and second linking portions, thereby achieving much better improvement in thermal conductivity in the thickness direction thereof than the typical graphite sheet.

Second Aspect: Method of Manufacturing Polyimide Film

A method of manufacturing a polyimide film according to the present invention includes:

(a) mixing an organic solvent, a diamine monomer and a dianhydride monomer to prepare a first polyamic acid solution;

(b) mixing inorganic fillers and polyimide fillers with the first polyamic acid solution to prepare a first precursor composition;

(c) forming a gel film by casting the first precursor composition onto a support, followed by drying the first precursor composition; and (d) imidizing the first precursor composition through heat treatment of the gel film to form a polyimide film.

The first polyamic acid solution may be prepared by dissolving an aromatic diamine monomer and an aromatic dianhydride monomer in an organic solvent to be present in the same mole amounts, followed by polymerization.

In preparation of the first polyamic acid, the polymerization process may include, for example, (1) a process in which the total amount of the diamine monomer is dissolved in the solvent and the dianhydride monomer is added to the resulting solution until the diamine monomer and the dianhydride monomer are present substantially in the same mole amounts, followed by polymerization;

(2) a process in which the total amount of the dianhydride monomer is dissolved in the solvent and the diamine monomer is added to the resulting solution until the diamine monomer and the dianhydride monomer are present substantially in the same mole amounts, followed by polymerization;

(3) a process in which some amounts of the diamine monomer are dissolved in the solvent and some amounts of the dianhydride monomer are mixed in an amount of about 95 mol % to about 105 mol % with respect to the reaction component, followed by adding the remaining amount of the diamine monomer and the remaining amount of the dianhydride monomer until the diamine monomer and the dianhydride monomer are present substantially in the same mole amounts, followed by polymerization;

(4) a process in which some amounts of the dianhydride monomer are dissolved in a solvent and some amounts of the diamine monomer are mixed in an amount of about 95 mol % to about 105 mol % with respect to the reaction component, followed by adding the remaining amount of the dianhydride monomer and the remaining amount of the diamine monomer until the diamine monomer and the dianhydride monomer are present substantially in the same mole amounts, followed by polymerization; or (5) a process in which a first composition is prepared by mixing some of the diamine monomer with some of the dianhydride monomer in one solvent such that one of the diamine monomer and the dianhydride monomer is present in an excess in the first composition, a second composition is prepared by mixing some of the diamine monomer with some of the dianhydride monomer in another solvent such that one of the diamine monomer and the dianhydride monomer is present in an excess in the second composition, and the first composition is mixed with the second composition such that, when the diamine monomer is present in an excess in the first composition, the dianhydride monomer is present in an excess in the second composition, and when the dianhydride monomer is present in an excess in the first composition, the diamine monomer is present in an excess in the second composition, until the diamine monomer and the dianhydride monomer are present substantially in the same mole amounts, followed by polymerization, without being limited thereto It should be understood that the polymerization process is not limited to the above examples and may be performed by any method known in the art.

Further, in Step (a), all of the monomers may be added at the same time or may be sequentially added. Upon sequentially adding the monomers, partial polymerization can occur between the monomers and one of the monomers may be dividedly added for adjustment of viscosity.

The dianhydride monomer applicable to preparation of the first polyamic acid solution may include at least one selected from the group consisting of pyromellitic dianhydride (PMDA), 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 2,2-bis(3,4-dicarboxylphenyl)propane dianhydride, 3,4,9,10-perylenetetracarboxylic dianhydride, bis(3,4-dicarboxylphenyl)propane dianhydride, 1,1-bis(2,3-dicarboxylphenyl)ethane dianhydride, 1,1-bis(3,4-dicarboxylphenyl)ethane dianhydride, bis(2,3-dicarboxylphenyl)methane dianhydride, bis(3,4-dicarboxylphenyl)ethane dianhydride, oxydiphthalic anhydride, bis(3,4-dicarboxylphenyl)sulfone dianhydride, p-phenylene bis(trimellitic monoester acid anhydride), ethylene bis(trimellitic monoester acid anhydride), bisphenol A-bis(trimellitic monoester acid anhydride) and derivatives thereof, and mixtures thereof, without being limited thereto.

The diamine monomer applicable to preparation of the first polyamic acid solution may include at least one selected from the group consisting of 4,4'-diaminodiphenylpropane, 4,4'-diaminodiphenylmethane, benzidine, 3,3'-dichlorobenzidine, 4,4'-diaminodiphenylsulfide, 3,3'-diaminodiphenylsulfone, 4,4'-diaminodiphenylsulfone, 4,4'-diaminodiphenylether (4,4'-oxydianiline, ODA), 3,3'-diaminodiphenylether (3,3'-oxydianiline), 3,4'-diaminodiphenylether (3,4'-oxydianiline), 1,5-diaminonaphthalene, 4,4'-diaminodiphenyldiethylsilane, 4,4'-diaminodiphenylsilane, 4,4'-diaminodiphenyl ethyl phosphine oxide, 4,4'-diaminodiphenyl N-methyl amine, 4,4'-diaminodiphenyl N-phenyl amine, 1,4-diaminobenzene (p-phenylene diamine), 1,3-diaminobenzene, 1,2-diaminobenzene and derivatives thereof, and mixtures thereof, without being limited thereto.

It should be understood that the present invention is not limited thereto and may include any material known in the art.

The first polyamic acid solution may be present in an amount of about 5 wt % to about 35 wt %, preferably 10 wt % to 30 wt %, in terms of solid content. Within this range, the first polyamic acid solution can have a suitable molecular weight and viscosity.

The organic solvent may be selected from any solvents capable of dissolving the polyamic acid without limitation and may include, for example, an aprotic polar solvent.

Examples of the aprotic polar solvent may include an amide solvent, such as N,N'-dimethylformamide (DMF), N,N'-dimethylacetamide (DMAc), and the like, a phenol solvent, such as p-chlorophenol, o-chlorophenol, and the like, N-methyl-pyrrolidone (NMP), γ-butyrolactone (GBL), and diglyme, without being limited thereto. These solvents may be used alone or as a mixture thereof.

In some embodiments, an additional solvent, such as toluene, tetrahydrofuran, acetone, methyl ethyl ketone, methanol, ethanol, water, and the like, may be used to adjust solubility of the first polyamic acid. In one embodiment, the organic solvent particularly preferably used in preparation of the precursor composition may be an amide solvent, for example, N,N-dimethylformamide and N,N-dimethylacetamide.

A process of adding the inorganic fillers or the polyimide fillers is not limited to a particular method and may be performed by any method known in the art.

The polyimide fillers may be prepared by, for example, the following process. However, it should be understood that the following process is provided for illustration and is not to be construed in any way as limiting the present invention.

The process may include the steps of:

preparing a second polyamic acid through polymerization of an aromatic dianhydride monomer and a diamine monomer in an aprotic polar solvent;

adding graphene to the second polyamic acid, followed by stirring;

leaving the graphene-containing second polyamic acid at 60° C. to 100° C. for 2 hours to 6 hours;

ejecting the second polyamic acid to an excess of a solvent to form a sold extract while removing the solvent used in polymerization; and pulverizing the solid extract to prepare polyimide fillers in powder form.

The aprotic polar solvent, the dianhydride monomer and the diamine monomer that can be used in preparation of the second polyamic acid may be suitably selected from the compounds described above in the first polyamic acid.

The step of preparing the second polyamic acid may be suitably selected from among the non-limited examples described above in the method of preparing the first polyamic acid.

The step of adding graphene may be suitably selected from among (i) a process of adding the total amount of graphene to the second polyamic acid, followed by stirring; and (ii) a process of adding the total amount of graphene to the second polyamic acid during adjustment of viscosity of the second polyamic acid, followed by stirring.

Here, adjustment of viscosity of the second polyamic acid may mean a process of adjusting the viscosity of the second polyamic acid by dividedly adding a small amount of any one of the diamine monomer and the dianhydride monomer, which is present in a smaller mole ratio than the other monomer, until the second polyamic acid reaches a desired viscosity. As a result, the diamine monomer and the dianhydride monomer can be present in the same moles through this process.

In one embodiment, in Step (b), a dehydration agent and an imidization agent may be further added to the first polyamic acid solution.

The dehydration agent refers to a component that promotes ring-closing reaction through dehydration of the polyamic acid and may include at least one selected from the group consisting of, for example, aliphatic acid anhydrides, aromatic acid anhydrides, N,N'-dialkylcarbodiimide, halogenated lower aliphatic acid anhydride, halogenated lower fatty acid anhydride, aryl phosphonic acid dihalide, and thionyl halide, without being limited thereto.

In particular, aliphatic acid anhydrides may be used from the viewpoint of availability and cost. The aliphatic acid anhydrides may include, for example, acetic anhydride (AA), propionic acid anhydride, and lactic acid anhydride, without being limited thereto. These may be used alone or as a mixture thereof.

The imidization agent refers to a component that promotes ring-closure reaction of the polyamic acid and may include an imine component, for example, an aliphatic tertiary amine, an aromatic tertiary amine, a heterocyclic tertiary amine, and the like.

In particular, a heterocyclic tertiary amine may be used from the viewpoint of reactivity as a catalyst. The heterocyclic tertiary amine may include, for example, quinoline, isoquinoline, β-picoline, and pyridine, without being limited thereto. These may be used alone or as a mixture thereof.

The dehydration agent may be present in an amount of about 0.5 moles to about 5 moles, preferably about 1.0 to about 4 moles, per 1 mole of the amic acid group in the polyamic acid.

The imidization agent may be present in an amount of about 0.05 moles to about 3 moles, preferably 0.2 moles to 2 moles, per 1 mole of the amic acid group in the polyamic acid.

If the content of the dehydration agent or the imidization agent is less than the above range, there can be a problem of insufficient chemical imidization, fracture during sintering, or deterioration in mechanical strength.

If the content of the dehydration agent or the imidization agent exceeds the above range, it is difficult to cast the precursor composition into the form of a film due to rapid imidization.

According to one embodiment, in Step (b), a first catalyst having a linear structure and a second catalyst having a ring structure may be further added to the first polyamic acid solution. Here, the second catalyst may be present in an amount of about 10 mol % to about 30 mol % based on the total amount of the first catalyst and the second catalyst.

According to this embodiment, the first polyamic acid solution containing the second catalyst in a particular range can achieve improvement in packing properties of polymer chains of the polyamic acid. Here, the packing properties may refer to properties wherein the polymer chains of the polyamic acid are regularly arranged and overlap each other such that the overall molecular structure of the polyamic acid can become regular.

In manufacture of the polyimide film, the polyamic acid having improved packing properties can secure improvement in packing efficiency of the polymer chains of the polyimide film, whereby the overall molecular structure of the polyimide can have regularity and includes a large amount of crystalline portions.

Accordingly, the graphite sheet manufactured using such a polyimide film has good crystallinity, which results from regular arrangement of carbon atoms in the regular molecular structure of the polyimide and can contribute to improvement in thermal conductivity of the graphite sheet, particularly thermal conductivity thereof in the plane direction.

If the content of the second catalyst is less than 10 mol % or less, it is difficult to achieve improvement in packing properties and crystallinity, thereby causing insufficient improvement in thermal conductivity of the graphite sheet.

If the content of the second catalyst exceeds 30 mol %, the polyimide film can suffer from significant deterioration in mechanical strength due to deterioration in imidization rate or a longer time is required for the same imidization rate, thereby deteriorating overall process efficiency.

The first catalyst and the second catalyst may be added in a total amount of 1.5 moles to 4.5 moles per 1 mole of an amic acid group in the polyamic acid.

If the content of the first catalyst or the second catalyst exceeds or is less than the above range, the polyimide film can suffer from deterioration in thermal and/or mechanical properties.

The first catalyst having a linear structure may include at least one selected from the group consisting of dimethylacetamide (DMAc), N,N-diethylacetamide, dimethylformamide (DMF), and diethylformamide (DEF), most preferably dimethylformamide in terms of improvement in thermal conductivity.

The second catalyst having a ring structure may include at least one selected from the group consisting of N-methyl-2-pyrrolidone (NMP), N-ethylpyrrolidone (NEP), N-vinylpyrrolidone, and 1,3-dimethyl-2-imidazolidinone, most preferably N-methylpyrrolidone.

According to one embodiment, in Step (c) of forming the gel film, the precursor composition cast onto the support may be dried at about 40° C. to about 300° C., specifically at about 80° C. to about 200° C., more specifically at about 100° C. to about 180° C., particularly specifically at about 100° C. to about 130° C., thereby forming a dried gel film In some embodiments, in order to adjust thickness and size of a final polyimide film while improving alignment thereof, the method of manufacturing the polyimide film may further include stretching the gel film. Stretching may be performed in at least one of a machine direction MD and a transverse direction (TD) with respect to the machine direction.

Preferably, in the gel film, a volatile component is present in an amount of about 5 wt % to about 500 wt %, more preferably about 5 wt % to about 200 wt %, particularly preferably about 5 wt % to about 150 wt %. Within this range, it is possible to prevent film fracture, generation of color spots, property degradation, and the like during heat treatment for formation of the polyimide film.

Here, the volatilized content of the gel film may be calculated by Equation 1, where A indicates the weight of the gel film and B indicates the weight of the gel film after heating at 450° C. for 20 minutes.

$$(A-B) \times 100/B \quad (1)$$

According to one embodiment, in Step (d), the gel film may be secured to a tenter and subjected to heat treatment at about 50° C. to about 700° C., more specifically at about 150° C. to about 600° C., particularly specifically at about 200° C. to about 600° C., to remove remaining solvent from the gel film while allowing imidization of substantially most remaining amic acid groups, thereby forming the polyimide film.

In some embodiments, the polyimide film may be further cured by finish heating at about 400° C. to about 650° C. for about 5 seconds to about 400 seconds under a predetermined load in order to relieve residual stress of the polyimide film Third Aspect: Graphite Sheet The graphite sheet according to the present invention may be manufactured using the "polyimide film" described above or a polyimide film manufactured by the "method of manufacturing a polyimide film" described above, specifically through carbonization and/or graphitization of the polyimide film.

The graphite sheet may have a thickness of 10 μm to 100 μm, a thermal conductivity of 1,000 W/m·K or more in the plane direction thereof, and a thermal conductivity of 60 W/m·K or more in the thickness direction thereof.

In one embodiment, carbonization of the polyimide film may be performed under a reduced pressure or under a nitrogen/argon gas atmosphere by raising the temperature of the furnace from room temperature to about 1,000° C. to about 1,500° C. and maintaining the temperature for about 12 hours.

Carbonization of the polyimide film may be performed using a hot press and/or an electric furnace.

In some embodiments, pressure may be applied to the polyimide film in a perpendicular direction using the hot press for high alignment of carbon atoms. Upon carbonization, a pressure of about 5 kg/cm$^2$ or more, preferably about 15 kg/cm$^2$ or more, more preferably about 25 kg/cm$^2$ or more, may be applied to the graphite sheet. It should be understood that these conditions are provided for illustration and the present invention is not limited thereto.

Graphitization of the carbonized polyimide film may be performed subsequent to carbonization.

Graphitization may also be performed using a hot press and/or an electric furnace.

Graphitization may be performed under a nitrogen/argon gas atmosphere by raising the temperature of the furnace from room temperature to a temperature of 2,500° C. to 3,000° C. and maintaining the raised temperature for about 10 hours.

In some embodiments, a pressure of about 100 kg/cm$^2$ or more, preferably 200 kg/cm$^2$ or more, more preferably 300 kg/cm$^2$ or more, may be applied to the graphite sheet upon graphitization. It should be understood that these conditions are provided for illustration and the present invention is not limited thereto.

BRIEF DESCRIPTION OF DRAWINGS

FIG. 1 is a picture of a surface of a polyimide film manufactured in Example 1.

FIG. 2 is a picture of a surface of a polyimide film manufactured in Example 4.

MODE FOR INVENTION

Next, the present invention will be described in more detail with reference to some examples. It should be understood that these examples are provided for illustration only and are not to be in any way construed as limiting the invention.

Example 1

Preparative Example 1-1: Preparation of Polyimide Fillers

With 200 g of N,N'-dimethylacetamide (DMAc) placed in a 1 L reactor, the temperature of the reactor was reduced to 0° C. and 17.23 g (84.4 mmol) of 4,4'-oxyphenylenediamine (ODA) was added to the reactor to dissolve N,N'-dimethylacetamide (DMAc).

Then, 18.4 g (84.4 mmol) of 1,2,4,5-benzenetetracarboxylicdianhydride (PMDA) was added dropwise to the resulting solution.

The resulting mixture was stirred for 30 minutes while adjusting the reaction temperature of the mixture so as not to exceed 40° C. and the temperature of the reactor was slowly raised to 80° C., followed by stirring the mixture at the raised temperature for 4 hours, thereby preparing a polyamic acid solution.

0.97 g (3 parts by weight) of graphene particles having a sheet structure, an average major diameter of 10 μm and an average length of 2 nm with respect to the perpendicular direction were added to the prepared polyamic acid solution and evenly dispersed therein.

Then, the prepared polyamic acid solution was dipped in 800 g of methanol, ejected in a stripe shape, and left for 10 hours. Methanol floating on the polyamic acid having a stripe shape was removed once every 3 hours, followed by adding 600 g of methanol to remove the solvent.

After 10 hours, all methanol was removed and the remaining solid product was pulverized using a pulverizing machine. Then, the resulting powder was washed with water and methanol, filtered, and dried in a vacuum oven at 40° C. for 10 hours, thereby preparing powder-shaped polyimide fillers having an average particle diameter of 3 μm.

Preparative Example 1-2: Preparation of First Precursor Composition

As an organic solvent, 404.8 g of dimethylformamide (DMF) was placed in a 0.5 L reactor under a nitrogen atmosphere. With the temperature of the reactor set to 25° C., 45.59 g of ODA was added as a diamine monomer to the reactor and stirred for 30 minutes until the diamine monomer was dissolved, and 49.66 g of PMDA was added as a dianhydride monomer until the resulting solution had a viscosity of 100,000 cP to 150,000 cP, thereby preparing a first polyamic acid.

Thereafter, as inorganic fillers, 0.26 g of dicalcium phosphate particles having an average particle diameter of 3 μm were added to the polyamic acid together with 0.56 g of the polyimide fillers prepared in Preparative Example 1-1, and stirred for 1 hour while maintaining the temperature of the reactor, thereby preparing a precursor composition.

In conversion for comparison, the inorganic fillers were present in an amount of 0.3 parts by weight and the polyimide fillers were present in an amount of 1 part by weight relative to 100 parts by weight of the first polyamic acid in the precursor composition in terms of solid content.

Preparative Example 1-3: Preparation of Polyimide Film 2.25 g of beta-picoline (BP) as an imidization agent, 16.73 g of acetic anhydride (AA) as a dehydration agent, 9.5 g of DMF as a first catalyst, and 3.2 g of NMP as a second catalyst were added to 70 g of the precursor composition prepared in Preparative Example 1-2, and were evenly stirred therewith. Then, the resulting composition was cast to a thickness of 350 μm on an SUS plate (100SA, Sandvik) using a doctor blade and dried in a temperature range of 100° C. to 200° C.

Thereafter, the dried film was peeled off of the SUS plate and secured to a pin frame for transfer to a hot tenter.

In the hot tenter, the film was heated from 200° C. to 600° C., cooled to 25° C., and separated from the pin frame, thereby providing a polyimide film having a size of 20 cm×20 cm×50 μm (length×width×thickness).

Example 2

A polyimide film was manufactured in the same manner as in Example 1 except that polyimide fillers having an average particle diameter of 1 μm were prepared through adjustment of the stirring rate in Preparative Example 1-1.

Example 3

A polyimide film was manufactured in the same manner as in Example 1 except that polyimide fillers having an average particle diameter of 10 μm were prepared through adjustment of the stirring rate in Preparative Example 1-1.

Example 4

A polyimide film was manufactured in the same manner as in Example 1 except that the amount of the polyimide fillers was changed to 0.1 parts by weight.

Example 5

A polyimide film was manufactured in the same manner as in Example 1 except that the amount of the polyimide fillers was changed to 5 parts by weight.

Example 6

A polyimide film was manufactured in the same manner as in Example 1 except that the amount of the inorganic fillers was changed to 0.5 parts by weight.

Example 7

A polyimide film was manufactured in the same manner as in Example 1 except that barium sulfate particles having an average particle diameter of 3 μm were added in an amount of 0.3 parts by weight as the inorganic fillers.

Comparative Example 1

A polyimide film was manufactured in the same manner as in Example 1 except that the polyimide fillers were not used.

Comparative Example 2

A polyimide film was manufactured in the same manner as in Example 1 except that the inorganic fillers were not used.

Comparative Example 3

A polyimide film was manufactured in the same manner as in Example 1 except that the polyimide fillers and the inorganic fillers were not used.

Comparative Example 4

A polyimide film was manufactured in the same manner as in Example 1 except that polyimide fillers having an average particle diameter of 15 μm were prepared through adjustment of the stirring rate in Preparative Example 1-1.

Comparative Example 5

A polyimide film was manufactured in the same manner as in Example 1 except that the amount of the polyimide fillers was changed to 10 parts by weight.

Comparative Example 6

A polyimide film was manufactured in the same manner as in Example 1 except that the amount of the polyimide fillers was changed to 0.05 parts by weight.

Comparative Example 7

A polyimide film was manufactured in the same manner as in Example 1 except that the amount of the inorganic fillers was changed to 0.1 parts by weight.

Comparative Example 8

A polyimide film was manufactured in the same manner as in Example 1 except that the amount of the inorganic fillers was changed to 0.6 parts by weight.

Comparative Example 9

A polyimide film was manufactured in the same manner as in Example 1 except that dicalcium phosphate particles having an average particle diameter of 5 μm were used.

Comparative Example 10

A polyimide film was manufactured in the same manner as in Example 1 except that dicalcium phosphate particles having an average particle diameter of 1 μm were used.

Comparative Example 11

A polyimide film was manufactured in the same manner as in Example 1 except that the second catalyst was not used and 11.84 g of DMF was used as the first catalyst in Preparative Example 1-3.

Comparative Example 12

A polyimide film was manufactured in the same manner as in Example 1 except that the amount of graphene was changed to 0.5 parts by weight relative to 100 parts by weight of the solid content in Preparative Example 1-1.

Experimental Example 1

For each of the polyimide films of Examples and Comparative Examples, external appearance was observed depending upon the average particle diameter and the input amount of the polyimide fillers and/or the inorganic fillers.

In the experiment, the polyimide films manufactured in Examples 1 to 7, which satisfied conditions for the average particle diameters and the input amounts according to the present invention, were compared with the polyimide films manufactured in Comparative Example 4, 5, 8 and 9, which failed to satisfy the conditions for the average particle diameters and the input amounts according to the present invention. The number of surface defects of each of the polyimide films was counted with the naked eye and evaluation results are shown Table 1, FIG. 1 (Example 1) and FIG. 2 (Comparative Example 4).

TABLE 1

| Kind | PI fillers Size (μm) | PI fillers Content (parts by weight) | Inorganic fillers Calcium phosphate Size (um) | Inorganic fillers Calcium phosphate (parts by weight) | Inorganic fillers Barium sulfate (parts by weight) | Surface defect (Number) |
|---|---|---|---|---|---|---|
| Example 1 | 3 | 1 | 3 | 0.3 | — | 0 |
| Example 2 | 1 | 1 | 3 | 0.3 | — | 0 |
| Example 3 | 10 | 1 | 3 | 0.3 | — | 0 |
| Example 4 | 3 | 0.1 | 3 | 0.3 | — | 0 |
| Example 5 | 3 | 5 | 3 | 0.3 | — | 0 |
| Example 6 | 3 | 1 | 3 | 0.5 | — | 0 |
| Example 7 | 3 | 1 | 3 | — | 0.3 | 0 |
| Comparative Example 4 | 15 | 1 | 3 | 0.3 | — | 31 |
| Comparative Example 5 | 3 | 10 | 3 | 0.3 | — | 22 |
| Comparative Example 8 | 3 | 1 | 3 | 0.6 | — | 5 |
| Comparative Example 9 | 3 | 1 | 5 | 0.3 | — | 9 |

It could be seen that numerous surface defects were generated on each of the polyimide films of Comparative Examples 4, 5, 8 and 9 prepared using the polyimide fillers and/or the inorganic fillers, the average particle diameters and the input amounts of which did not fall within the numerical ranges according to the present invention. Further, referring to FIG. 2 showing a picture of a surface of the polyimide film of Comparative Example 4, it could be seen that the polyimide film of Comparative Example 4 had poor surface quality, as observed with the naked eye.

Accordingly, it could be seen that use of an excess of the polyimide fillers and/or an excess of the inorganic fillers or use of excessively large particles provided polyimide films having unsmooth surfaces.

Conversely, it could be seen that the polyimide films of Examples manufactured using the polyimide fillers and/or the inorganic fillers, the average particle diameters and the input amounts of which were within the numerical ranges according to the present invention, did not suffer from surface defects. Further, referring to FIG. 1 showing a picture of a surface of the polyimide film of Example 1, it could be seen that the polyimide film of Example 4 had good surface quality, as observed with the naked eye.

Experimental Example 2

Each of the polyimide films of Examples and Comparative Examples was heated to 1,200° C. at a heating rate of 3° C./min in a high temperature furnace under a nitrogen atmosphere and was left at the same temperature for about 2 hours (carbonization). Then, the polyimide film was heated to 2,800° C. at a heating rate of 5° C./min in an ultra-high temperature furnace under an argon atmosphere and was left for about 1 hour (graphitization), followed by cooling, thereby preparing a graphite sheet having a thickness of 30 μm. Here, for the polyimide films of Comparative Examples 2 and 3, a graphite sheet could not be obtained despite performing a trial on carbonization and graphitization according to the above procedure.

For each of the manufactured graphite sheets, thermal conductivity in the plane direction and in the thickness direction and the number of bright spots were measured and results are shown in Table 2.

For each of the graphite sheets, heat diffusion rates in the thickness direction and in the plane direction were measured by a laser flash method using a diffusion rate measurement instrument (Model: LFA 467, Netsch), and thermal conductivity was calculated by multiplying the measured heat diffusion rate by density (weight/volume) and specific heat (specific heat value measured by DSC).

The number of bright spots is a factor that causes surface defects of the graphite sheets and the number of protrusions having a height of 0.05 mm or more in a square of 50 mm×50 mm of the graphite sheet was counted.

TABLE 2

| Kind | Thermal conductivity in plane direction (W/m · K) | Thermal conductivity in thickness direction (W/m · K) | The number of bright spots (EA) |
|---|---|---|---|
| Example 1 | 1133.7 | 66.6 | 1 |
| Example 2 | 1195.6 | 68.8 | 2 |
| Example 3 | 1068.2 | 69.7 | 2 |
| Example 4 | 1181.1 | 68.1 | 3 |
| Example 5 | 1051.2 | 71.0 | 4 |
| Example 6 | 1144.7 | 66.6 | 1 |
| Example 7 | 1054.8 | 66.7 | 2 |
| Comparative Example 1 | 1142.2 | 5.4 | 3 |
| Comparative Example 2 | — | — | — |
| Comparative Example 3 | — | — | — |
| Comparative Example 4 | 903.9 | 66.8 | 8 |
| Comparative Example 5 | 840.2 | 73.7 | 11 |
| Comparative Example 6 | 1139.4 | 4.9 | 4 |
| Comparative Example 7 | 992.6 | 48.3 | 2 |
| Comparative Example 8 | 1112.3 | 49.1 | 19 |
| Comparative Example 9 | 957.1 | 44.5 | 23 |
| Comparative Example 10 | 888.3 | 45.8 | 3 |
| Comparative Example 11 | 1004.7 | 42.0 | 3 |
| Comparative Example 12 | 1128.4 | 33.2 | 2 |

From Table 2, the following results could be obtained.

First, all of the polyimide films of Examples were manufactured using a suitable amount of the polyimide fillers having an average particle diameter according to the present invention. Each of the graphite sheets manufactured using such polyimide films had very good thermal conductivity, that is, a thermal conductivity of 1,000 W/m·K or more in the plane direction and a thermal conductivity of 60 W/m·K or more in the thickness direction, and 5 or fewer bright spots indicating good surface quality.

It is estimated that this result was obtained due to graphitization of at least some polyimide particles between the layers of the multilayer graphite structure to form a linking portion acting as a heat transfer path between the layers thereof.

In addition, it is estimated that, since the polyimide fillers contained graphene having good thermal conductivity, at least some graphene formed another linking portion between the layers of the multilayer graphite structure, thereby further improving thermal conductivity in the thickness direction.

Further, it is estimated that some graphene particles were interposed between the layers of the multilayer graphite structure to be parallel to the layers thereof, thereby further improving thermal conductivity both in the thickness direction and in the plane direction.

Conversely, it could be seen that the graphite sheet of Comparative Example 1 prepared using the polyimide film free from the polyimide fillers had much lower thermal conductivity in the thickness direction than the graphite sheets of Examples.

It is understood that, since the graphite sheet of Comparative Example 1 had a gap between the layers of the multilayer graphite structure instead of the aforementioned linking portion, the graphite sheet suffered from inefficient heat transfer between the layers.

That is, there can be a significant difference in thermal conductivity of the graphite sheet in the thickness direction thereof depending upon the presence of the polyimide particles.

Secondly, although an excess of the polyimide fillers can be taken into account in order to form more linking portions, Comparative Example 5 (10 parts by weight) shows that the graphite sheet including an excess of the polyimide fillers has much lower thermal conductivity in the plane direction than the graphite sheets of Examples. In addition, it should be noted that a number of bright spots was formed on the graphite sheet of Comparative Example 5.

Upon carbonization and graphitization, most components of the fillers in the polyimide film are sublimated and a higher amount of sublimation gas provides a higher possibility of fracture of the graphite structure. In general, it is estimated that the bright spots are formed upon simultaneous discharge of a large amount of the gas. Thus, generation of a number of bright spots can be understood as strong evidence for fracture of the multilayer graphite structure.

Consequently, in Comparative Example 5, it is estimated that a large amount of gas derived from an excess of the polyimide fillers partially damaged the multilayer graphite structure while obstructing rearrangement of carbon atoms in the course of carbonization and graphitization, thereby causing deterioration in thermal conductivity of the graphite sheet in the plane direction thereof.

On the other hand, use of the polyimide fillers having a larger particle size can be taken into account in order to form more linking portions and this will be described with reference to Comparative Example 4.

In Comparative Example 4, although the polyimide film was manufactured using a suitable amount of the polyimide fillers having an average particle diameter of 15 μm, the polyimide film did not exhibit desired thermal conductivity in the plane direction thereof and it is estimated that a large amount of gas was generated and obstructed rearrangement of carbon atoms in the course of carbonization and graphitization, thereby failing to provide a desired result.

On the other hand, it could be seen that the polyimide film of Comparative Example 6 including a relatively small amount of the polyimide fillers had significantly low thermal conductivity in the thickness direction thereof. It is understood that this result was caused by insufficient formation of the linking portion due to addition of a trace amount of the polyimide fillers.

From the above results, it can be seen that the content and the particle size of the polyimide fillers are critical factors in realization of a graphite sheet having good thermal conductivity both in the plane direction and in the thickness direction.

Thirdly, a graphite sheet could not be obtained using the polyimide films of Comparative Examples 2 and 3 not including the inorganic fillers. Accordingly, it can be seen that the inorganic fillers act as a critical factor in conversion from polyimide into graphite.

In Comparative Examples 7 and 8, a trace amount or an excess of the inorganic fillers was added, and in Comparative Examples 9 and 10, the inorganic fillers having an excessively small size or an excessively large size was used. In these examples, the graphite sheets exhibited much lower thermal conductivity in at least one of the plane direction and the thickness direction than the polyimide films of Examples, as shown in Table 2. These results indicate that, irrespective of the presence of the inorganic fillers, the amount and size of the inorganic fillers falling within the numerical ranges of the present invention are important factors.

Fourthly, in Comparative Example 11, the polyimide film was manufactured using a first catalyst having a linear structure alone and it could be understood that the graphite sheet manufactured using the polyimide film of Comparative Example 11 had relatively low thermal conductivity in the plane direction and in the thickness direction, as shown in Table 2.

It is estimated that this result was caused by relatively low packing efficiency of polyimide chains in the course of imidization of the polyamic acid.

Contrary to Comparative Example 11, the graphite sheets manufactured using the polyimide films of Examples using the second catalyst together with the first catalyst exhibited much better thermal conductivity both in the plane direction and in the thickness direction than the graphite sheet manufactured using the polyimide film of Comparative Example 11. From this result, it can be anticipated that use of a suitable amount of the second catalyst can induce improvement in packing efficiency of the polyimide chains and such improvement in packing efficiency advantageously will allow regular arrangement of carbon atoms upon carbonization and graphitization.

Fifthly, in Comparative Example 12, the polyimide film was manufactured using the polyimide fillers containing a relatively small amount of graphene outside of the numeral range thereof. As shown in Table 2, the graphite sheet manufactured using the polyimide film exhibited lower thermal conductivity in the thickness direction thereof than the graphite sheets manufactured using the polyimide films of Examples and it can be reasonably understood that graphene acts as a very important factor in improvement in thermal conductivity in the thickness direction of the graphite sheet.

It should be understood that various modifications, changes, alterations, and equivalent embodiments can be made by those skilled in the art without departing from the spirit and scope of the present invention.

INDUSTRIAL APPLICABILITY

Various advantages of the present invention obtained by including the sublimable inorganic fillers and the polyimide fillers have been described above in detail.

In summary, in the polyimide film according to the present invention, the graphene-containing polyimide fillers may form at least one linking portion between the layers of the multilayer graphite structure to provide a heat transfer path upon carbonization and graphitization. With this structure, the polyimide film according to the present invention can realize a graphite sheet achieving significant improvement in thermal conductivity not only in the plane direction thereof but also in the thickness direction thereof.

The polyimide film according to the present invention includes a suitable amount of inorganic fillers to induce expansion of the polyimide film, thereby realizing a graphite sheet having good flexibility.

According to the present invention, two or more types of catalysts having different characteristics are used upon imidization of a precursor composition of the polyimide film, thereby realizing a polyimide film that achieves improvement in packing efficiency of polymer chains. Such a polyimide film can realize a graphite sheet having improved thermal conductivity.

The invention claimed is:

1. A polyimide film for graphite sheets derived from a precursor composition comprising a first polyamic acid, the polyimide film comprising:
   sublimable inorganic fillers; and
   graphene-containing spherical polyimide fillers,.
   wherein the graphene-containing spherical polyimide fillers comprise polyimide chains derived from a second polyamic acid and contain 1 part by weight to 5 parts by weight of graphene relative to 100 parts by weight of the second polyamic acid.

2. The polyimide film according to claim 1, wherein the sublimable inorganic fillers are present in an amount of 0.2 parts by weight to 0.5 parts by weight relative to 100 parts by weight of the first polyamic acid, and the graphene-containing spherical polyimide fillers are present in an amount of 0.1 parts by weight to 5 parts by weight relative to 100 parts by weight of the first polyamic acid.

3. The polyimide film according to claim 1, wherein the sublimable inorganic fillers have an average particle diameter of 1.5 μm to 4.5 μm and the graphene-containing spherical polyimide fillers have an average particle diameter of 1 μm to 10 μm.

4. The polyimide film according to claim 1, wherein the sublimable inorganic fillers comprise at least one type of inorganic particles selected from the group consisting of dicalcium phosphate, barium sulfate and calcium carbonate.

5. The polyimide film according to claim 1, wherein a composition of monomers constituting the second polyamic acid is the same as or different from a composition of monomers constituting the first polyamic acid.

6. The polyimide film according to claim 1, wherein the polyimide film comprises first polyimide chains derived from the first polyamic acid, at least some of the first polyimide chains are aligned in a plane direction to form a multilayer structure of the first polyimide chains, and at least some of the graphene-containing spherical polyimide fillers are dispersed between layers of the multilayer structure of the first polyimide chains.

7. The polyimide film according to claim 6, wherein, upon carbonization and/or graphitization of the polyimide film, at least part of the multilayer structure of the first polyimide chains is graphitized to form a multilayer graphite structure and at least part of the graphene-containing spherical polyimide fillers is graphitized to form a linking portion connecting layers of the multilayer graphite structure to each other.

8. The polyimide film according to claim 7, wherein the linking portion comprises a first linking portion formed by graphitization of second polyimide chains of the graphene-containing spherical polyimide fillers and a second linking portion derived from the graphene of the graphene-containing spherical polyimide fillers.

9. A method of manufacturing the polyimide film according to claim 1, comprising:

(a) mixing an organic solvent, a diamine monomer and a dianhydride monomer to prepare a first polyamic acid solution;
(b) mixing the sublimable inorganic fillers and the graphene-containing spherical polyimide fillers with the first polyamic acid solution to prepare a first precursor composition;
(c) forming a gel film by casting the first precursor composition onto a support, followed by drying the first precursor composition; and
(d) imidizing the first precursor composition through heat treatment of the gel film to form the polyimide film,
wherein the graphene-containing spherical polyimide fillers comprise polyimide chains derived from a second polyamic acid and contain 1 part by weight to 5 parts by weight of graphene relative to 100 parts by weight of the second polyamic acid.

10. The method according to claim 9, wherein, in step (b), a first catalyst having a linear structure and a second catalyst having a ring structure are further added to the first polyamic acid solution.

11. The method according to claim 10, wherein the first catalyst comprises at least one selected from the group consisting of dimethylacetamide (DMAc), N,N-diethylacetamide, dimethylformamide (DMF), and diethylformamide (DEF).

12. The method according to claim 10, wherein the first catalyst is dimethylformamide.

13. The method according to claim 10, wherein the second catalyst is N-methyl-2-pyrrolidone (NMP).

14. The method according to claim 10, wherein the first catalyst and the second catalyst are added in a total amount of 1.5 moles to 4.5 moles per 1 mole of an amic acid group in a polyamic acid.

15. The method according to claim 10, wherein the first catalyst is present in an amount of 10 mol % to 30 mol % based on the total amount of the first catalyst and the second catalyst.

16. The method according to claim 9, wherein, in step (b), a dehydration agent and an imidization agent are further added to the first polyamic acid solution.

17. A graphite sheet manufactured through carbonization and/or graphitization of the polyimide film according to claim 1.

18. The graphite sheet according to claim 17, wherein the graphite sheet has a thickness of 10 μm to 100 μm.

19. The graphite sheet according to claim 17, wherein the graphite sheet has a thermal conductivity of 1,000 W/m·K or more in a plane direction thereof.

20. The graphite sheet according to claim 17, wherein the graphite sheet has a thermal conductivity of 60 W/m·K or more in a thickness direction thereof.

21. An electronic device comprising the graphite sheet according to claim 17.

* * * * *